(12) United States Patent
McIntyre et al.

(10) Patent No.: US 6,571,063 B2
(45) Date of Patent: May 27, 2003

(54) COVER FOR A CAMERA FOR PROTECTING IMAGE CAPTURE LENS AND ELECTRONIC IMAGE DISPLAY

(75) Inventors: Dale F. McIntyre, Honeoye Falls, NY (US); Michael W. DeVries, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/951,682

(22) Filed: Sep. 13, 2001

(65) Prior Publication Data
US 2003/0049030 A1 Mar. 13, 2003

(51) Int. Cl.[7] .................. G03B 17/08; G03B 17/04; H04N 5/222
(52) U.S. Cl. .................. 396/287; 396/348; 396/448; 348/333.01
(58) Field of Search ............... 396/448, 348, 396/535, 287; 348/333.1, 333.06

(56) References Cited

U.S. PATENT DOCUMENTS

| | | | |
|---|---|---|---|
| 5,822,638 A | 10/1998 | Yoshida et al. | 396/448 |
| 5,943,520 A | 8/1999 | Komatsuzaki et al. | 396/448 |
| 6,322,259 B1 * | 11/2001 | Miyamoto et al. | 396/448 |

* cited by examiner

Primary Examiner—David M. Gray
Assistant Examiner—Rochelle Blackman
(74) Attorney, Agent, or Firm—Raymond L. Owens

(57) ABSTRACT

A protective cover for a camera having a housing with front and rear portions, the front portion including a mounting structure for an image capture lens and the rear portion having an electronic image display, the protective cover, including front and rear portions, the cover being slideably mounted on the camera so that it is effective in at least a first camera active position and in a second camera storage position, and the rear portion including an opening corresponding to the electronic image display such that, in the first camera active position, the opening corresponds to and permits viewing of the electronic image display and in the second camera storage position, the rear portion covers the electronic image display to protect such electronic image display.

7 Claims, 9 Drawing Sheets

COVER FOR A CAMERA FOR PROTECTING IMAGE CAPTURE LENS AND ELECTRONIC IMAGE DISPLAY

FIELD OF THE INVENTION

The present invention relates to cameras, either conventional or digital, and more particularly to a cover arrangement for protection of both the electronic image electronic image display and the image capture lens.

BACKGROUND OF THE INVENTION

It is well known in the camera art to provide a moveable cover, which is effective in a first position for covering and thereby protecting an image capture lens and an electronic display. Currently, cameras are including electronic displays on the rear portion of the camera housing for reviewing images captured by the camera. These displays are becoming higher resolution, larger and thus more expensive, which permit a user to view the image that is about to be or just was captured by the camera. Examples of specific technologies used in such displays are liquid crystal displays (LCD) and organic light emitting displays (OLED). One problem with these displays is that they are open to their environment in their active or operative positions. With such an expensive component, they are very vulnerable to damage such as scratches or surface cracks through normal use and storage.

In U.S. Pat. No. 5,822,638 to Yoshida et al., a camera is shown with a moveable cover which is used to protect a capture lens and an electronic display when the camera is in a storage position. However, in an operative position, the electronic display is exposed and therefore vulnerable to damage. Likewise in U.S. Pat. No. 5,943,520 to Komatsuzaki et al., a camera is shown with camera control buttons, capture lens, and electronic display becoming available to the user when a sliding cover is moved to a first active position. The first active position does not protect the electronic display from damage during camera usage.

Prior art displays being protected by a moveable cover when in a second storage position have typically been status displays for displaying the frame number, flash status, etc. The segments used to form characters and numerals in these status displays are large, and therefore scratches or other superficial damage doesn't significantly impact the function of these status displays. As electronic displays are now being used to display the actual image captured, superficial damage significantly impacts the ability of the display to accurately render the details of the captured scene. As such, a further problem with these displays is that they are relatively small displays, and therefore difficult for the user to see the detail in the picture. The sliding covers in the prior art do not help the user to more easily view the displays. These and other problems will be solved by the present invention.

SUMMARY OF THE INVENTION

It is an object of the present invention to provide protection of both camera capture lens and the electronic display with a very simple structure.

This object is achieved by a protective cover for a camera having a housing with front and rear portions, the front portion including a mounting structure for an image capture lens and the rear portion having an electronic image display, the protective cover comprising:

a) front and rear portions, the cover being slideably mounted on the camera so that it is effective in at least a first camera active position and in a second camera storage position;

b) the rear portion including an opening corresponding to the electronic image display such that, in the first camera active position, the opening corresponds to and permits viewing of the electronic image display and in the second camera storage position, the rear portion covers the electronic image display to protect such electronic image display; and c) the front portion being effective to cover the image capture lens in the second camera storage position and permit the image capture lens to capture an image in the first camera active position.

ADVANTAGES

It is an advantage of the present invention that the cover can effectively protect the display in both the storage position and the active position. It further can also protect the lens in the storage position.

A feature of the present invention is that the cover can include a lens that, in the active position, magnifies the display image.

DETAILED DESCRIPTION OF THE INVENTION

Figure 1:
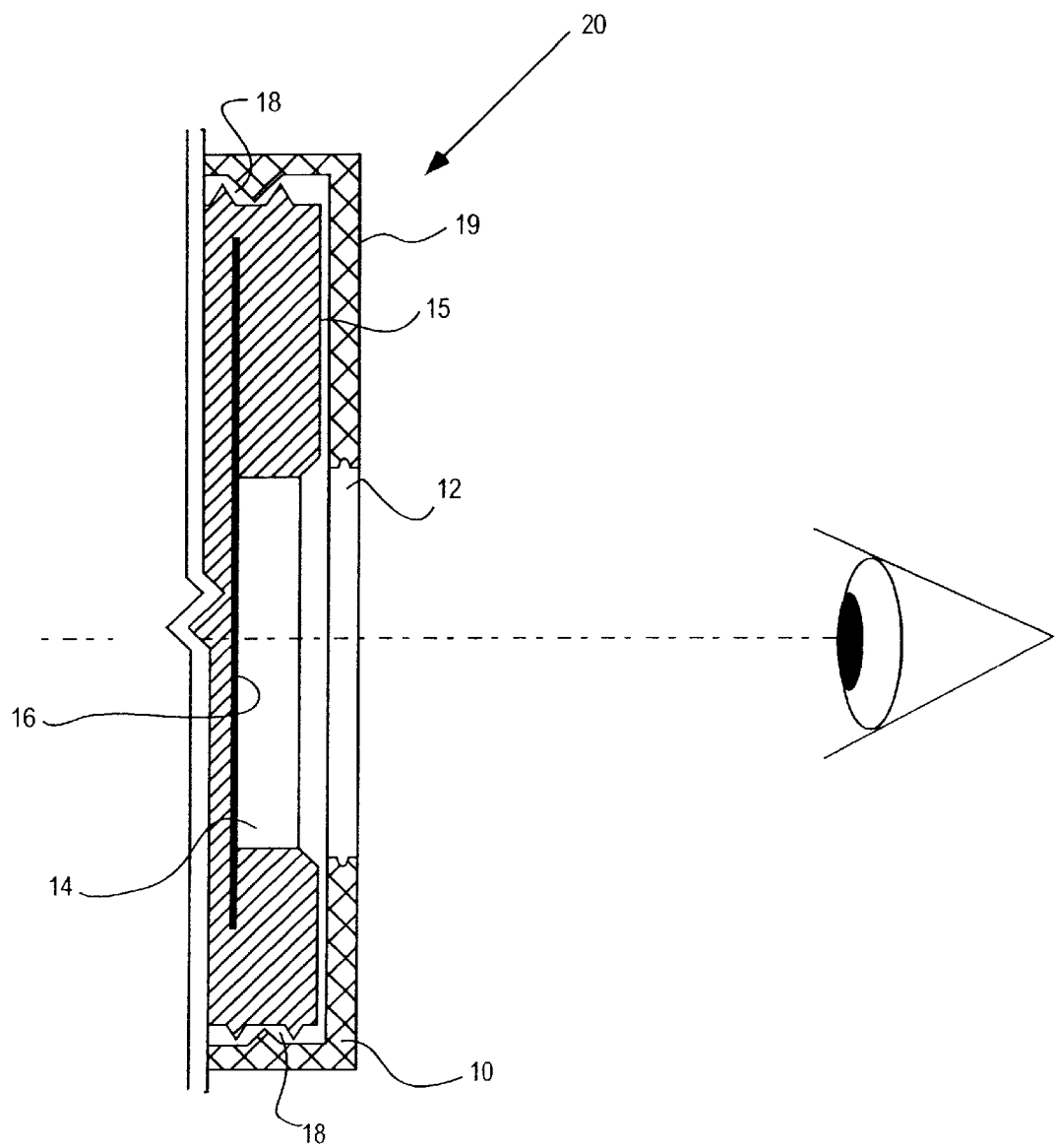
FIG. 1 shows a portion of a cross sectional view of a camera with a moveable protective cover, the rear portion of which includes an opening that is aligned with an electronic image display in the camera.
Figure 3A:
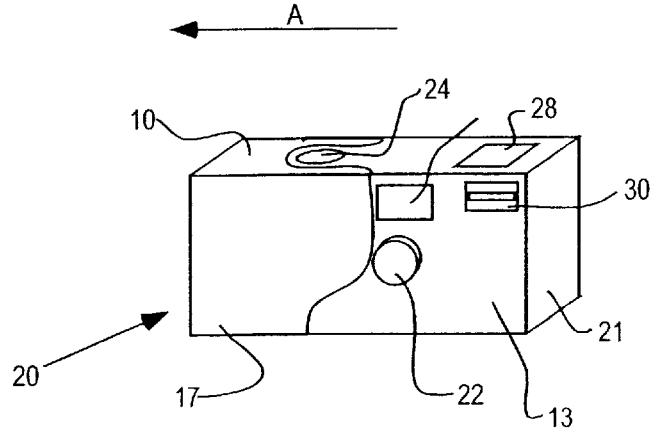
FIGS. 3A and 3B are similar views to those in FIGS. 2A and 2B except showing the protective cover in the first camera active position.
Figure 3B:
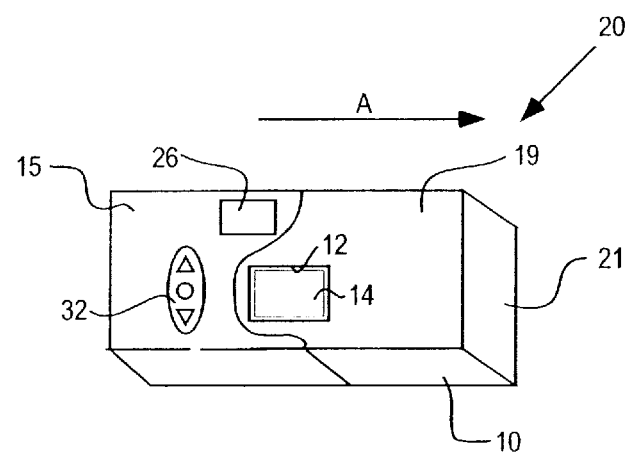

Turning now to FIG. 1, a portion of a cross sectional view of a camera 20 with a moveable protective cover 10 which further includes an opening 12 for permitting a user to view an electronic image display 14 when moveable protective cover 10 is in a first active position as illustrated in FIG. 1 and more fully in FIG. 3B. It will be understood that opening 12 can be a void in the moveable protective cover 10, or it can preferably contain a transparent material such as a plastic that serves to protect the electronic image display 14 during the operation of camera 20. Camera 20 is enclosed by a housing 21 that is comprised of a front portion 13 (see FIG. 3A) including a mounting structure for an image capture lens 22 and a rear portion 15 including the electronic image display 14. Electronic image display 14 is shown mounted on a circuit board 16 permitting it to be viewed from the rear portion/surface 15 of the camera housing 21. Moveable protective cover 10 moves along a path A (see FIGS. 3A/3B) defined by structures 18, which in the embodiment of FIG. 1, is a set of rails formed cooperatively both in the camera housing 21 and the moveable protective cover 10.

Figure 2A:
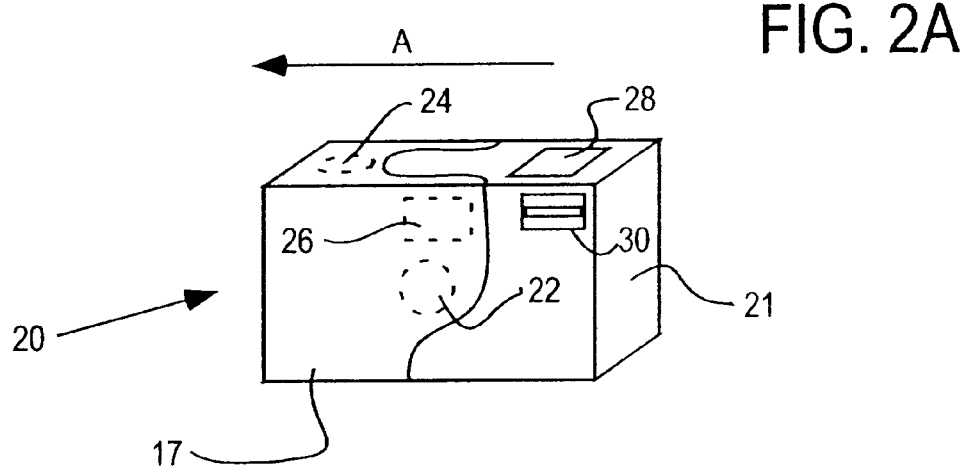
FIGS. 2A and 2B respectfully depict the front and rear portions of the protective cover in the second camera storage position.

FIG. 2A shows a front view of camera 20 with a front portion 17 of the moveable protective cover 10 in the second camera storage position. A conventional status display 28 for displaying camera status such as frame number and feature activation is shown along with a conventional electronic flash 30 both of which are not protected by the moveable protective cover 10 in the second camera storage position. An image capture lens 22, an image capture button 24, and a viewfinder 26 in this second camera storage position are shown as dotted lines as they are protected and therefore hidden in this second storage position. The positioning of the viewfinder 26 behind the moveable protective cover 10 in the second storage position positively communicates to the user that the camera 20 is inoperative or in the second storage position.

Figure 2B:
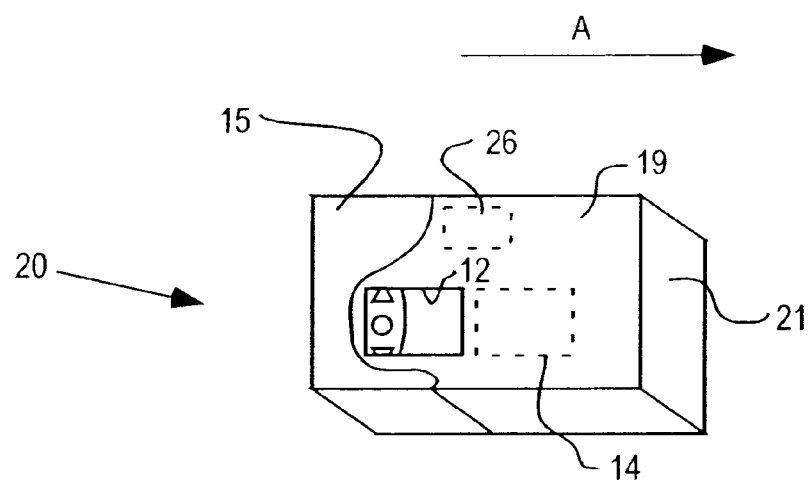

FIG. 2B shows a rear view of camera 20 with a rear portion 19 of the moveable protective cover 10 in the second camera storage position. The electronic image display 14, shown as a dotted line, is covered by the rear portion 19 of the moveable protective cover 10 to protect the electronic image display 14 in the second camera storage position.

Turning now to FIG. 3A, camera 20 is shown with moveable protective cover 10 having been moved by the user along path A to the first active position for the capturing of images. Image capture lens 22 has been revealed by the movement of the moveable protective cover 10 and permits the capturing of images. In this embodiment, the first active position also permits the user to access the image capture button 24 (also commonly referred to as a shutter button). Furthermore, the viewfinder 26 is similarly revealed in the first active position and becomes operative as a result. The status display 28 and the electronic flash 30 are unaffected by the positioning of the moveable protective cover 10.

In FIG. 3B, the camera 20 is shown as a rear view in the first operative position. Moveable protective cover 10 has been moved to a first active position for the operation of the camera revealing electronic image display 14. In this first active position, electronic image display 14 is aligned with the corresponding opening 12, thus permitting the viewing of the electronic image display 14. As discussed previously, opening 12 can also contain a transparent plastic to protect the electronic display in the first active position. Selection buttons 32 have also been revealed to achieve an operationally active position.

Figure 4A:
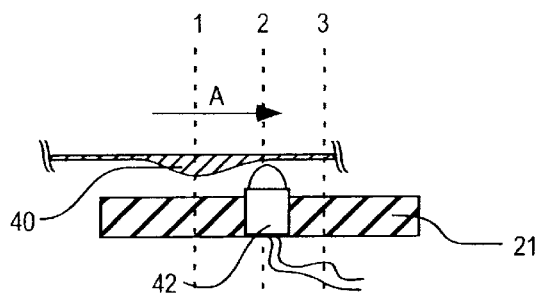
FIGS. 4A, 4B, and 4C is a series of cross sectional drawings which depict how signals are provided when the cover is moved between the first and second positions.
Figure 4B:
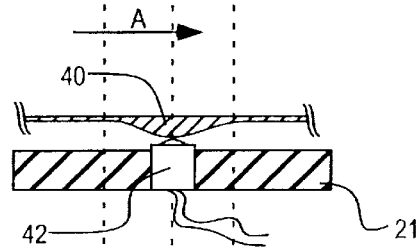
Figure 4C:
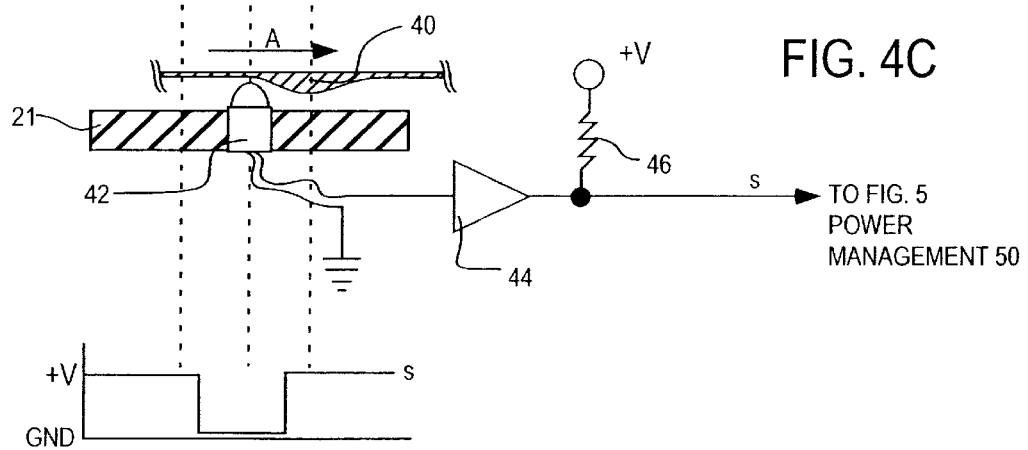

Turning now to FIGS. 4A, 4B, and 4C, a feature 40 of the moveable protective cover 10 is shown in cross section. As moveable protective cover 10 begins to travel along path A from the second storage position denoted by the dotted line 1 to the first active position denoted by the dotted line 3, feature 40 activates a switch 42 which is mounted in camera housing 21. Activation of switch 42 causes a signal S to change states from logic level "1" to a logic level "0" and back to a logic level "1" as shown in FIG. 4C. Signal S is received by a power management block 50 (FIG. 5) which in turn causes the camera 20 to initiate a power up sequence to reach a first active state. As shown in FIG. 4C, a simple electronic circuit is used to process the change in state of the switch 42 so that it can be properly interpreted by the power management block 50. In this case, an open collector buffer 44 is connected to one lead from the switch 42 with the other lead being connected to circuit ground (0V). When the switch 42 is not depressed (dotted lines 1,3), the input of open collector buffer 44 is floating, which simply means that it is not connected with a logic level. Connected to a circuit power supply +V, resistor 46 serves to limit current and thus provide signal S as a logic level "1". Similarly, depression of switch 42 (dotted line 2) causes current to flow through open collector buffer 44 to ground, thus causing signal S to become a logic level "0". In this manner, sliding the moveable protective cover 10 along path A causes the camera to power on from the second storage position to a first active position. Likewise, shutting the camera off involves sliding the moveable protective cover 10 in the direction opposite of path A and causing signal S to again pulse to a logic level "0".

Figure 5:
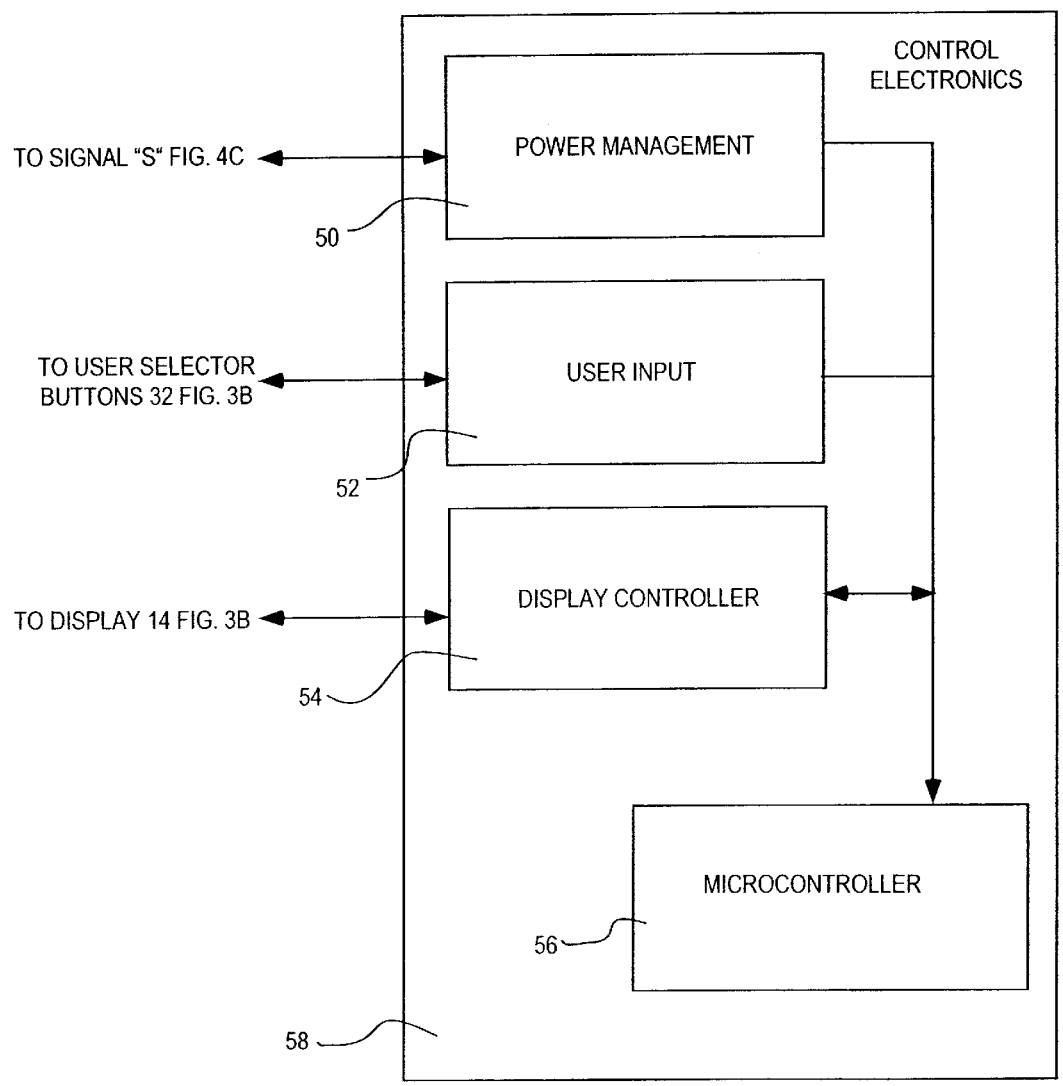
FIG. 5 is a block diagram of electronic circuitry within the camera which is responsive to the signals produced in FIG. 4.

Referring to FIG. 5, a block diagram of the control electronics 58 of camera 20 is shown. The power management block 50, as previously described, receives signal S (FIG. 4C) and interprets it as a change in the operational state of camera 20. If the camera was in the second storage position, the power management block 50 causes a microcontroller 56 to initiate a power on program sequence and reach a first active position for capturing of images. If the camera was in the first active position, another transition pulse on signal S causes microcontroller 56 to initiate a power down program sequence.

Microcontroller 56 also monitors user selector buttons 32 via-user input block 52 for permitting the user to interact with the operation of the camera 20. Display controller 54 receives signals from the microcontroller 56 to properly control the display of images and information on electronic image display 14.

Figure 6:
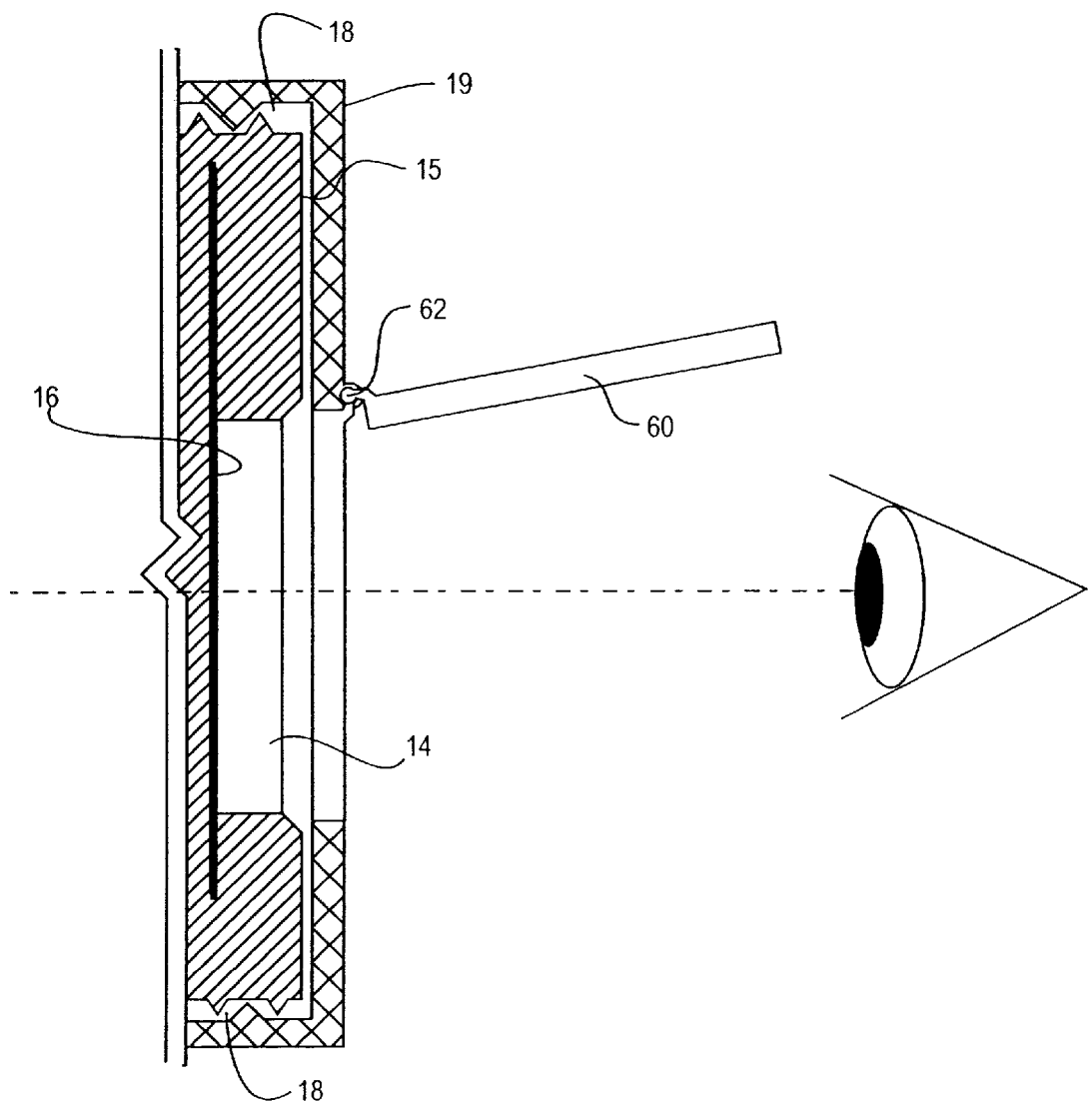
FIG. 6 is a similar cross sectional view of a portion of a camera shown in FIG. 1 wherein the opening in the rear portion of the protective cover includes a pivoting transparent portion.

Moving now to FIG. 6, there is shown another partial cross sectional view similar to FIG. 1, like numerals indicating like parts and operation, wherein an opening 12 is provided when a portion of the protective cover 60, which is pivotally mounted at pivot 62, is moved from a closed to an open position to permit the viewing or cleaning of the display.

Figure 7A:
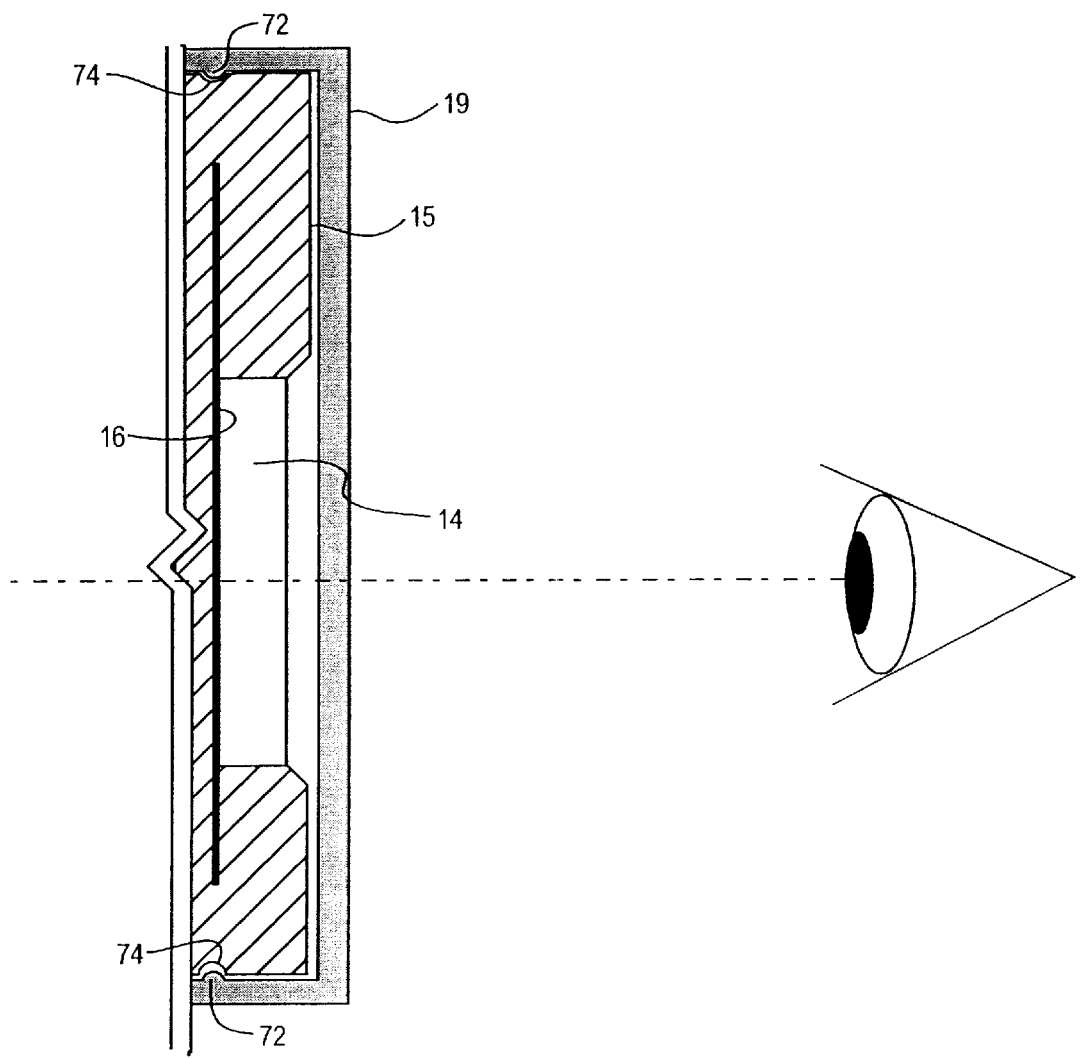
FIGS. 7A, 7B, 7C, and 7D is a series of cross sectional drawings of a portion of a camera wherein the opening in the rear portion of the protective cover includes a transparent portion that moves away from the electronic display to magnify the display in a first active position.
Figure 7B:
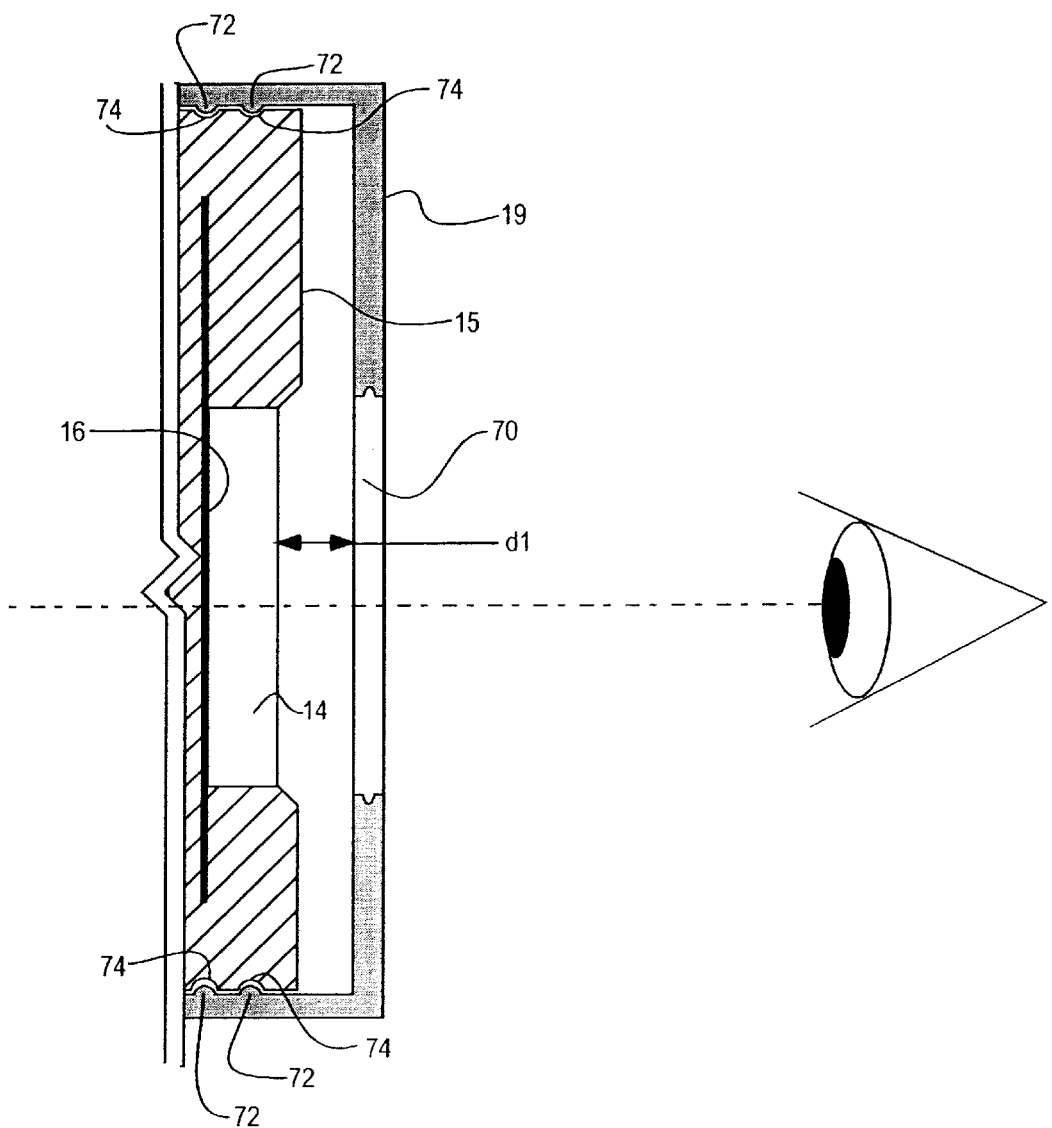
Figure 7C:
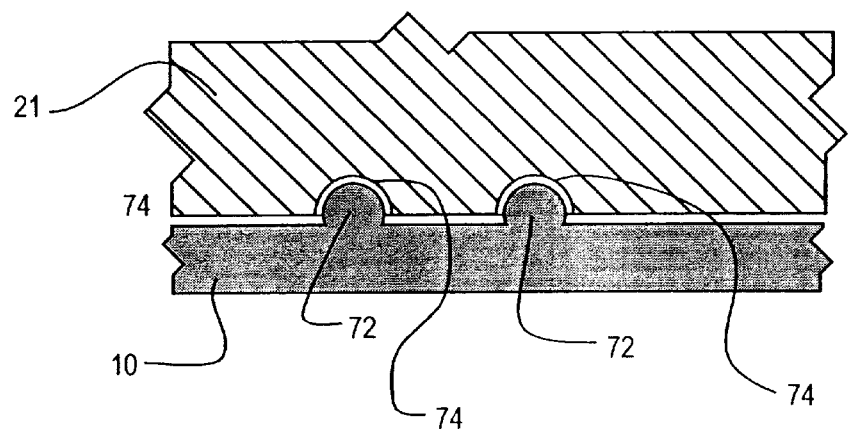
Figure 7D:
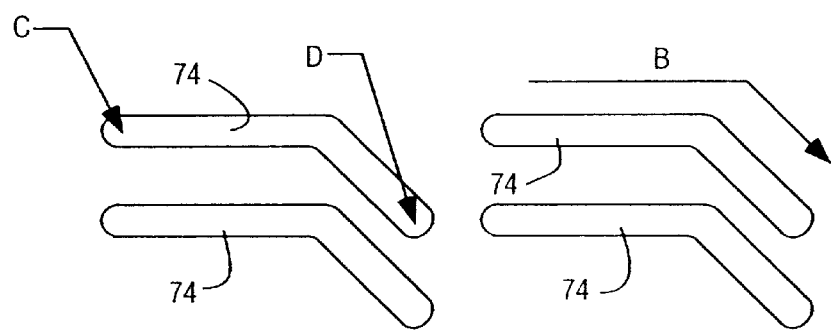

In FIG. 7A, a cross section view of the camera 20 taken when the camera 20 and moveable protective cover 10 are at position C of FIG. 7D depicts an alternative embodiment of the present invention. In this view, the camera 20 is shown in a second storage position (position C) or an inactive state. In this view, the moveable protective cover 10 is protecting the electronic image display 14 in a compact, storage position. Following the alternate path B shown in FIG. 7D, the moveable protective cover 10 moves to the first active position (position D) where a magnifying portion 70 contained within opening 12 aligns with the electronic image display 14 and is further displaced from the rear portion 15 of the camera 20 by a distance d1. Position D is shown as a cross sectional view of FIG. 7B where the moveable protective cover is in a magnifying position. Magnifying portion 70 can be, for example, a simple molded fresnel lens, or it can be a more complex optical structure with an finite object conjugate of distance d1 and a higher magnification factor.

In this embodiment, structures 18 are now a pin and track arrangement (see FIGS. 7C and 7D) where 4 pin features 72 of the moveable protective cover 10 follow path B in 4 track features 74 of the camera housing 21. In this manner, the pin and track arrangement provide both lateral displacement to align the moveable protective cover 10 with the electronic image display 14 and orthogonal displacement to magnify the electronic image display 14 for easier viewing by the user.

The invention has been described in detail with particular reference to certain preferred embodiments thereof, but it will be understood that variations and modifications can be effected within the spirit and scope of the invention.

PARTS LIST 10 moveable protective cover
12 opening
13 front portion
14 electronic image display
15 rear portion/surface
16 circuit board
17 front portion
18 structures
19 rear portion
20 camera
21 camera housing
22 image capture lens
24 image capture button
26 viewfinder
28 status display
30 electronic flash
32 selection buttons
40 feature
42 switch
44 open collector buffer
46 resistor
50 power management block
52 input block
54 display controller
56 microcontroller
58 control electronics
60 protective cover
62 pivot
70 magnifying portion
72 pin features
74 track features
d1 distance
A path
B path
C second storage position
D first active position
S signal
OV circuit ground
+V circuit power supply

What is claimed is:

1. A protective cover for a camera having a housing with front and rear portions, the front portion including a mounting structure for an image capture lens and the rear portion having an electronic image display, the protective cover, comprising:

a) the front and rear portions of the protective cover being slideably mounted on the camera housing so that the protective cover is effective in at least a first camera active position and in a second camera storage position;

b) the rear portion of the protective cover including an opening corresponding to the electronic image display such that, in the first camera active position, the opening corresponds to and permits viewing of the electronic image display and in the second camera storage position, the rear portion of the protective cover covers the electronic image display to protect such electronic image display; and c) the front portion of the protective cover being effective to cover the image capture lens in the second camera storage position and permit the image capture lens to capture an image in the first camera active position.

2. The protective cover of claim 1 further including a lens secured in the opening of the rear portion of the protective cover.

3. The protective cover of claim 1 wherein such protective cover is a unitary member.

4. The invention of claim 1 wherein the camera further includes means responsive to the protective cover being in the first camera active position and the second camera storage position for effectively signaling the camera that, in the first camera active position, the camera is ready to capture images and, in the second camera storage position, is disabled from capturing images.

5. A protective cover for a camera having a housing with front and rear portions, the front portion including a mounting structure for an image capture lens and the rear portion having an electronic image display, the protective cover, comprising:

a) the front and rear portions of the protective cover being slideably mounted on the camera housing so that the protective cover is effective in at least a first camera active position and in a second camera storage position; and b) the rear portion of the protective cover including an opening corresponding to the electronic image display such that, in the first camera active position, the opening corresponds to and permits viewing of the electronic image display and in the second camera storage position, the rear portion of the protective cover covers the electronic image display to protect such electronic image display.

6. The protective cover of claim 5 further including a lens secured in the opening of the rear portion of the protective cover.

7. The protective cover of claim 5 wherein such protective cover is a unitary member.

* * * * *